United States Patent
Lovas (10) Patent No.: US 9,845,056 B1
(45) Date of Patent: Dec. 19, 2017

(54) PIVOTING BAR LOCK FOR TRUCK BED CABINETS

(71) Applicant: Joe Lovas, Chino, CA (US)

(72) Inventor: Joe Lovas, Chino, CA (US)

( * ) Notice: Subject to any disclaimer, the term of this patent is extended or adjusted under 35 U.S.C. 154(b) by 21 days.

(21) Appl. No.: 15/084,585

(22) Filed: Mar. 30, 2016

(51) Int. Cl.
*E05B 65/52* (2006.01)
*B60R 9/06* (2006.01)

(52) U.S. Cl.
CPC ..................... *B60R 9/06* (2013.01)

(58) Field of Classification Search
CPC ........................................................ B60R 9/06
USPC ........... 70/32–34, 54–56; 292/259 R, 259 A, 292/DIG. 18; 109/53, 56, 57; 312/216, 312/221
See application file for complete search history.

(56) References Cited

U.S. PATENT DOCUMENTS

| | | | | |
|---|---|---|---|---|
| 201,209 A * | 3/1878 | Trenholm | .......... | B62D 33/0273 296/100.07 |
| 3,002,800 A * | 10/1961 | McMahan | ............ | E05B 65/467 292/205 |
| 3,189,392 A * | 6/1965 | Mehlig, Jr. | ........... | E05B 65/467 312/216 |
| 4,067,444 A | 1/1978 | Wilson | | |
| 4,607,253 A * | 8/1986 | Wooten | ................. | E05C 19/004 200/61.93 |
| 4,632,446 A | 12/1986 | Douglass | | |
| 4,792,168 A * | 12/1988 | Kardosh | ............ | E05B 65/0888 292/288 |
| 4,949,560 A * | 8/1990 | Anderson | ............... | E05B 67/38 70/2 |
| 5,103,659 A * | 4/1992 | Benefield, Sr. | ..... | A47G 29/1201 232/25 |
| 5,118,000 A | 6/1992 | Howell | | |
| 5,131,701 A * | 7/1992 | Stepniewski | ....... | E05B 65/0888 254/39 |
| 5,267,688 A * | 12/1993 | Benefield | ........... | A47G 29/1201 232/17 |
| 5,437,486 A * | 8/1995 | Hoffman | ............. | E05B 65/0888 292/339 |
| 6,102,474 A | 8/2000 | Daley | | |
| 6,641,236 B2 | 11/2003 | Grudzien | | |
| 6,868,702 B1 * | 3/2005 | Alkire | ................... | E05C 19/003 70/14 |
| 7,197,905 B2 * | 4/2007 | Ely | ..................... | E05B 65/0089 70/159 |
| 7,290,415 B2 * | 11/2007 | Rosenberg | ............ | E05B 67/383 70/34 |

(Continued)

FOREIGN PATENT DOCUMENTS

WO 2008019171 A2 10/2008

*Primary Examiner* — Lloyd Gall (57) ABSTRACT

The pivoting bar lock for truck bed cabinets is a device that is installed onto an existing truck, and which rotates about a direction of travel of a vehicle in order to enable access to or restrict access to truck bed cabinets of the vehicle. Truck bed cabinets are typically located on opposing exterior side surfaces of the vehicle. Moreover, the truck bed cabinets are provided on opposing exterior sides of the truck bed of a truck. The pivoting bar lock may include a frame that attaches to a rear truck bed surface as well as a front truck bed surface. Moreover, the frame extends vertically over top of the truck bed. The pivoting bar lock is further defined with a locking bar that is affixed to a first locking arm as well as a second locking arm.

7 Claims, 7 Drawing Sheets

(56) References Cited

U.S. PATENT DOCUMENTS

| | | | |
|---|---|---|---|
| 7,461,884 B2* | 12/2008 | Clare | B60R 11/06 296/181.4 |
| 7,562,546 B2* | 7/2009 | Taylor | E05B 67/36 248/551 |
| 7,810,854 B2* | 10/2010 | Hodge | B65F 1/1615 220/315 |
| 8,739,582 B2* | 6/2014 | Diesing | E05B 67/38 70/416 |
| 2004/0011092 A1* | 1/2004 | Haczynski | E05B 67/36 70/23 |
| 2005/0247084 A1* | 11/2005 | Rosenberg | E05B 67/383 70/32 |
| 2005/0252257 A1* | 11/2005 | Woods | E05B 67/04 70/33 |
| 2006/0016816 A1* | 1/2006 | Bremer | B65F 1/1615 220/322 |
| 2009/0085447 A1 | 4/2009 | McLuckie | |
| 2010/0102575 A1* | 4/2010 | Ferkovich | B65F 1/1615 292/259 R |
| 2010/0122559 A1* | 5/2010 | Chudzicki | E05B 13/002 70/56 |

* cited by examiner

PIVOTING BAR LOCK FOR TRUCK BED CABINETS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of locking devices, more specifically, a locking device that is adapted to secure and lock truck bed cabinets of a truck.

SUMMARY OF INVENTION

The pivoting bar lock for truck bed cabinets is a device that is adapted to be installed onto an existing truck, and which rotates about a direction of travel of a vehicle in order to enable access to or restrict access to truck bed cabinets of said vehicle. Truck bed cabinets are typically located on opposing exterior side surfaces of the vehicle. Moreover, the truck bed cabinets are provided on opposing exterior sides of the truck bed of a truck. The pivoting bar lock may include a frame that attaches to a rear truck bed surface as well as a front truck bed surface. Moreover, the frame extends vertically over top of the truck bed. The pivoting bar lock is further defined with a locking bar that is affixed to a first locking arm as well as a second locking arm. The first and second locking arms are provided at distal ends of the locking bar. The first and the second locking arms pivot with respect to the frame in order to obstruct or provide access to the truck bed cabinets. The frame and the first locking arm each include a lock bracket that when aligned enable a lock to be attached in order to secure the locking bar adjacent to the truck bed cabinets.

It is an object of the invention to provide a locking bar system that is adapted to be installed onto a truck in order to secure truck bed cabinets.

An even further object of the invention is to provide the locking bar that is able to pivot up to provide access to the truck bed cabinets, and alternatively, pivot down to prevent access to the truck bed cabinets by blocking the cabinet doors from opening outwardly from the truck bed.

These together with additional objects, features and advantages of the pivoting bar lock for truck bed cabinets will be readily apparent to those of ordinary skill in the art upon reading the following detailed description of the presently preferred, but nonetheless illustrative, embodiments when taken in conjunction with the accompanying drawings.

In this respect, before explaining the current embodiments of the pivoting bar lock for truck bed cabinets in detail, it is to be understood that the pivoting bar lock for truck bed cabinets is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the pivoting bar lock for truck bed cabinets.

It is therefore important that the claims be regarded as including such equivalent construction insofar as they do not depart from the spirit and scope of the pivoting bar lock for truck bed cabinets. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to a first potential embodiment of the disclosure, which is illustrated in FIGS. 1 through 7.

The pivoting bar lock for truck bed cabinets 100 (hereinafter invention) comprises a pivoting bar lock 101 that is further defined with a locking bar 102 that is affixed to a first locking arm 103 as well as a second locking arm 104. The locking bar 102 is further defined with a first distal end 105 as well as a second distal end 106. The first locking arm 103 is affixed to the locking bar 102 at the first distal end 105. The second locking arm 104 is affixed to the locking bar 102 at the second distal end 106.

The invention 100 is adapted for use with a vehicle 200. More specifically, the vehicle 200 is a truck that has a plurality of truck bed cabinets 201 provided on an exterior side surface of a truck bed 202 portion of the vehicle 200. The invention 100 works to either impede access to the plurality of truck bed cabinets 201 by locking in place in adaptive adjacency of the truck bed cabinets 201. Moreover, in a locking orientation (1-4), the locking bar 102 prevents a cabinet door 203 of any of the truck bed cabinets 201 from opening.

The first locking arm 103 and the second locking arm 104 are each able to pivot with respect to the vehicle 200 via a pivot pin 107. The pivot pin 107 interacts with a pivot bracket 108. The pivot bracket 108 is rigidly affixed to a frame 109. The frame 109 may be a part of the vehicle 200 or be a part of the invention 100. The frame 109 attaches to the vehicle 200, and extends upwardly and over the truck bed portion 202. The frame 109 is rigidly affixed to a rear bed surface 208 and a front bed surface 209 of the truck bed portion 202 of the vehicle 200.

Figure 3:
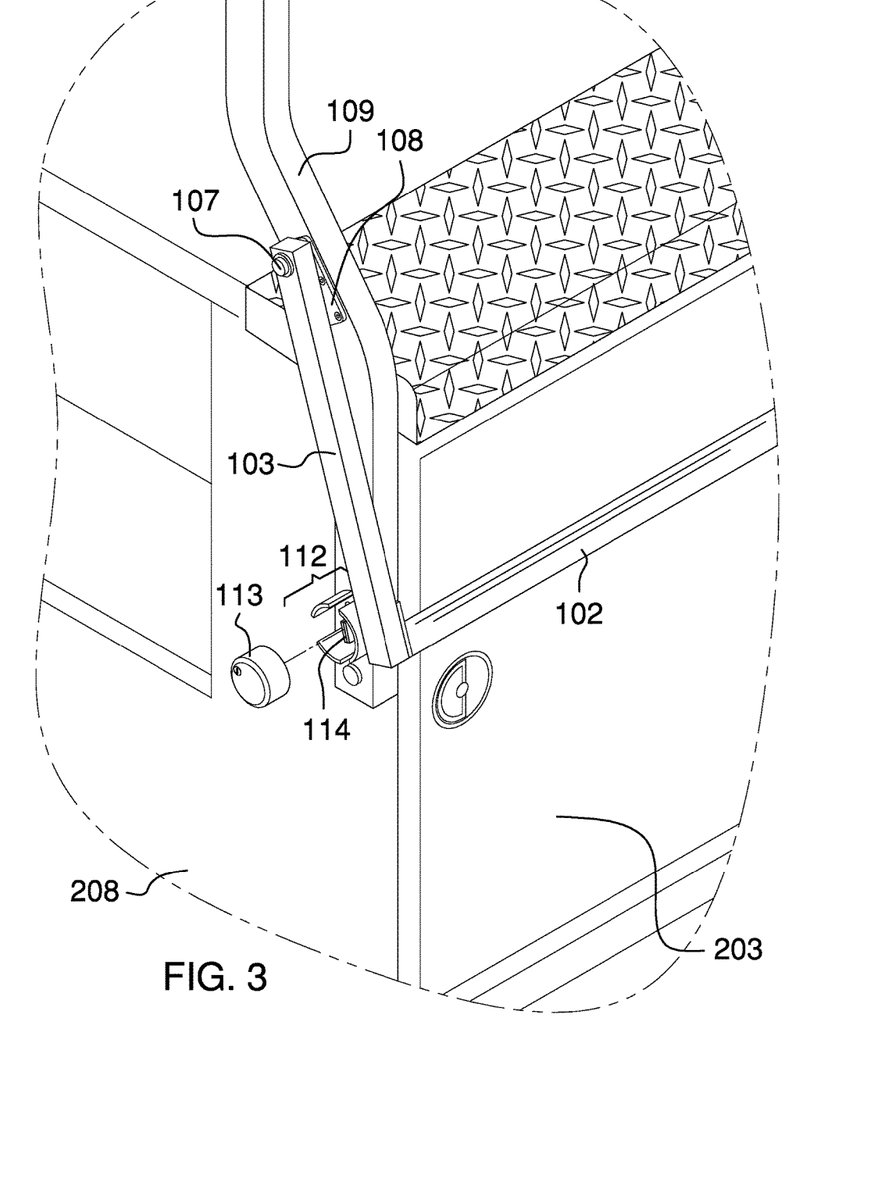
FIG. 3 is a close-up view of an embodiment of the disclosure.
Figure 4:
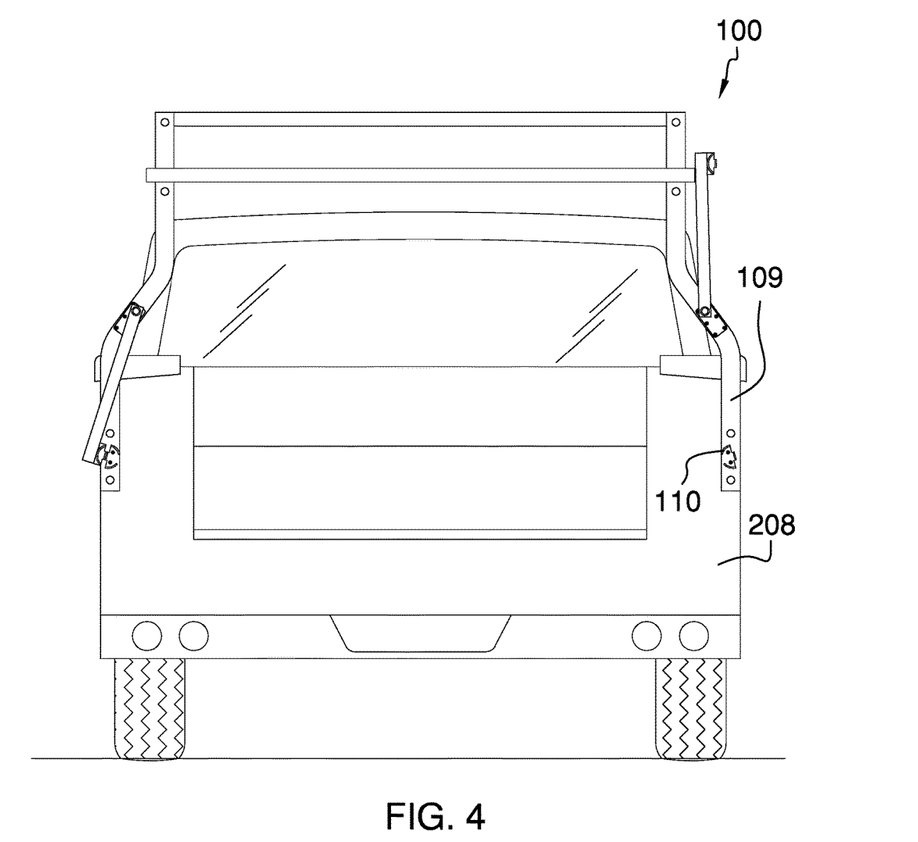
FIG. 4 is a rear view of an embodiment of the disclosure in use.
Figure 5:
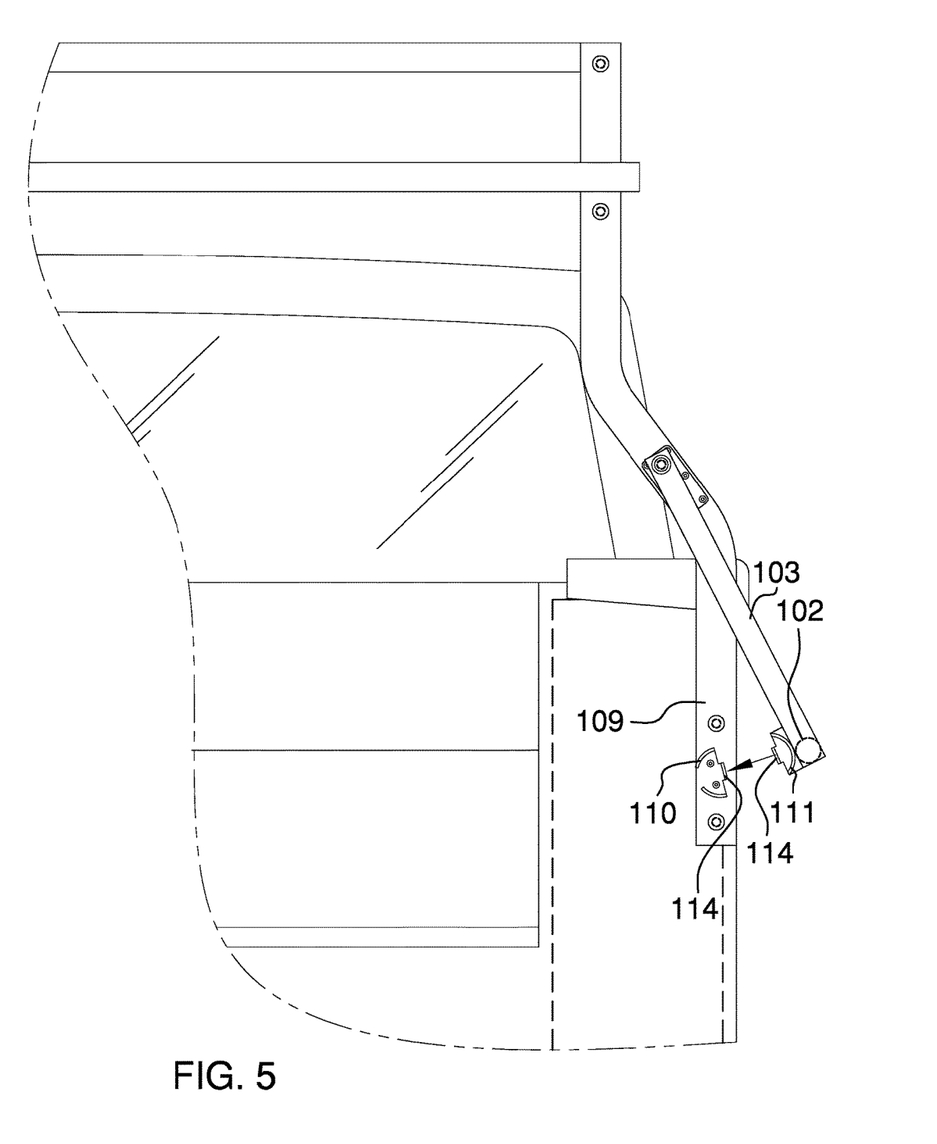
FIG. 5 is another rear view of an embodiment of the disclosure in use.
Figure 6:
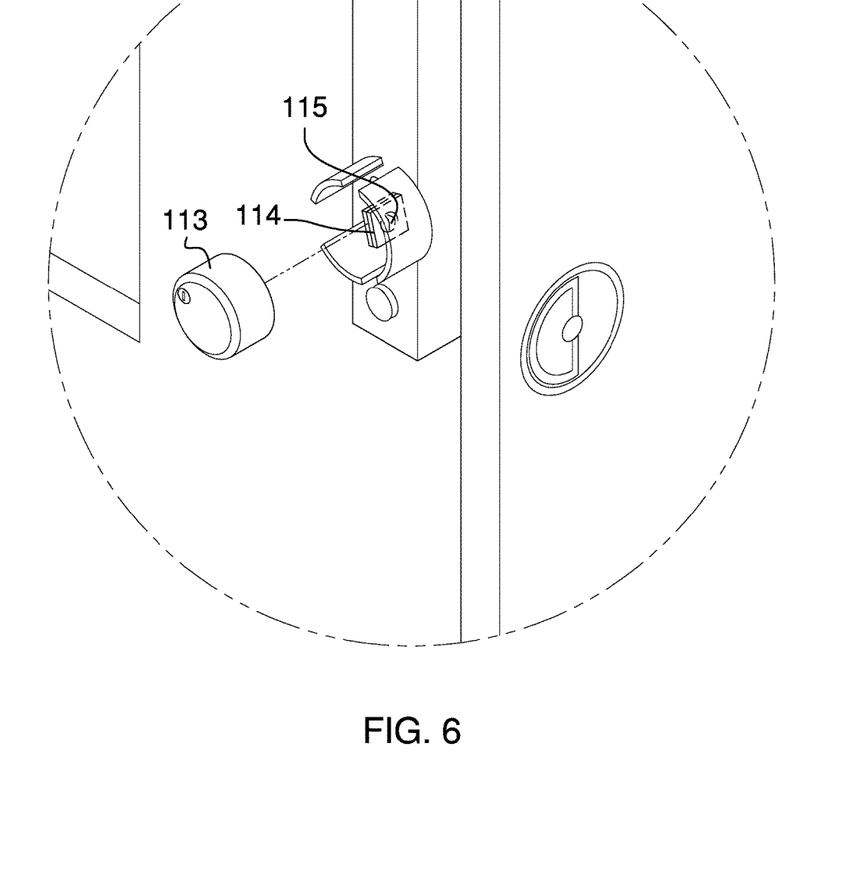
FIG. 6 is a detail view of an embodiment of the disclosure.

Referring to FIGS. 3 and 5, the frame 109 includes a first locking bracket 110. The first locking arm 103 includes a second locking bracket 111. The first locking bracket 110 and the second locking bracket 111 are able to align with one another provided the locking bar 102 is rotate down to the locking position (see FIGS. 3 and 4). The first locking bracket 110 and the second locking bracket 111 collectively form a perimeter wall 112 that is able to partially surround a lock 113 that is installed therein. Referring to FIGS. 3 and 5, the first locking bracket 110 and the second locking bracket 111 each have a lock tab 114 that touch one another when the first locking bracket 110 is aligned with the second locking bracket 111. The lock tabs 114 of the first locking bracket 110 and the second locking bracket 111 are aligned with one another and tab holes 115 provide thereon. The lock 113 secures the lock tabs 114 together via the tab holes 115.

In use, the locking bar 102, the first locking arm 103, and the second locking arm 104 collectively rotate about a lateral axis 300. The lateral axis 300 is parallel with the direction of travel of the vehicle 200. Moreover, the lateral axis 300 is defined via the pivot pins 107 and the pivot brackets 108.

Figure 7:
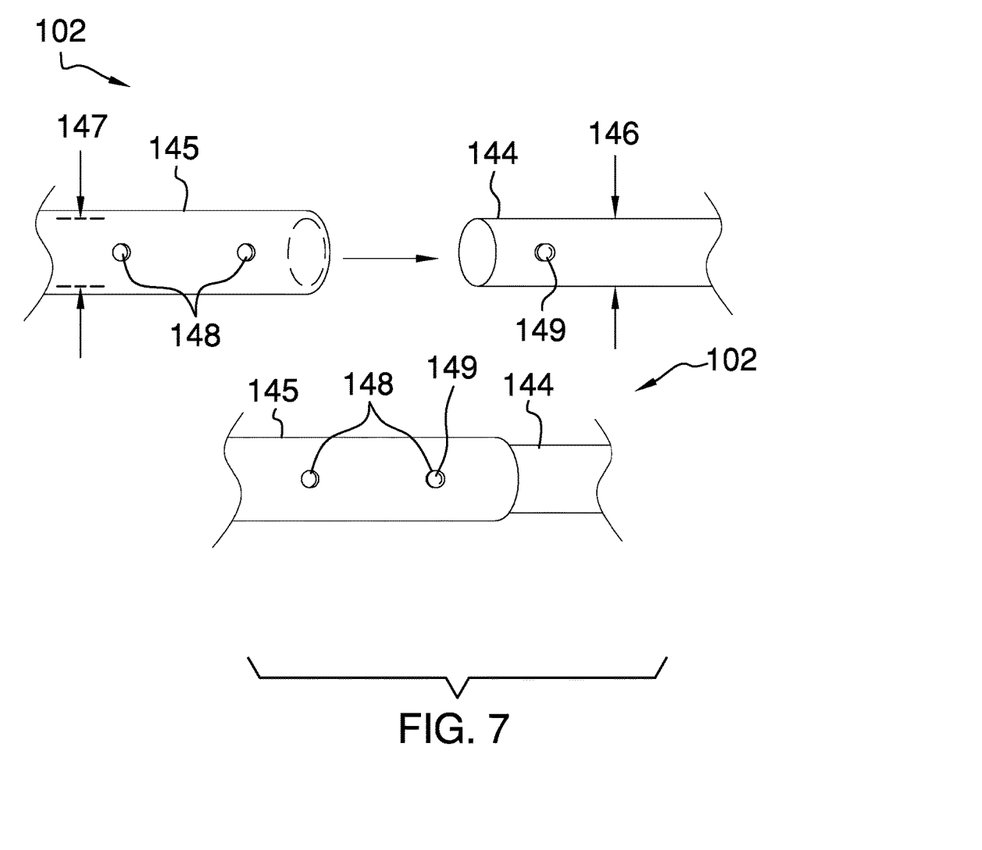
FIG. 7 is a detail view of an embodiment of the disclosure.

The locking bar 102 may be made of a tubular construction and utilize at least two pieces that are telescopically arranged with one another such that a locking bar length 133 may be adjusted. The ability of the locking bar length 133 to adjust, enables the invention 100 to accommodate truck bed portions 202 of varying sizes. Referring to FIG. 7, the locking bar 102 is further defined as a first bar member 144 and a second bar member 145. The first bar member 144 has a first outer diameter 146 that is less than a second inner diameter 147 of the second bar member 145. The first bar member 144 is able to slide into the second bar member 145. Moreover, at least one bar hole 148 is provided on the second bar member 145 to enable a spring-loaded button 149 provided on the first bar member 144 so as to enable adjustment of the locking bar length 133. In a scenario where the locking bar 102 is adjustable, the frame 109 shall be disclaimed, and be associated as a part of the vehicle 200, and not the invention 100.

Figure 1:
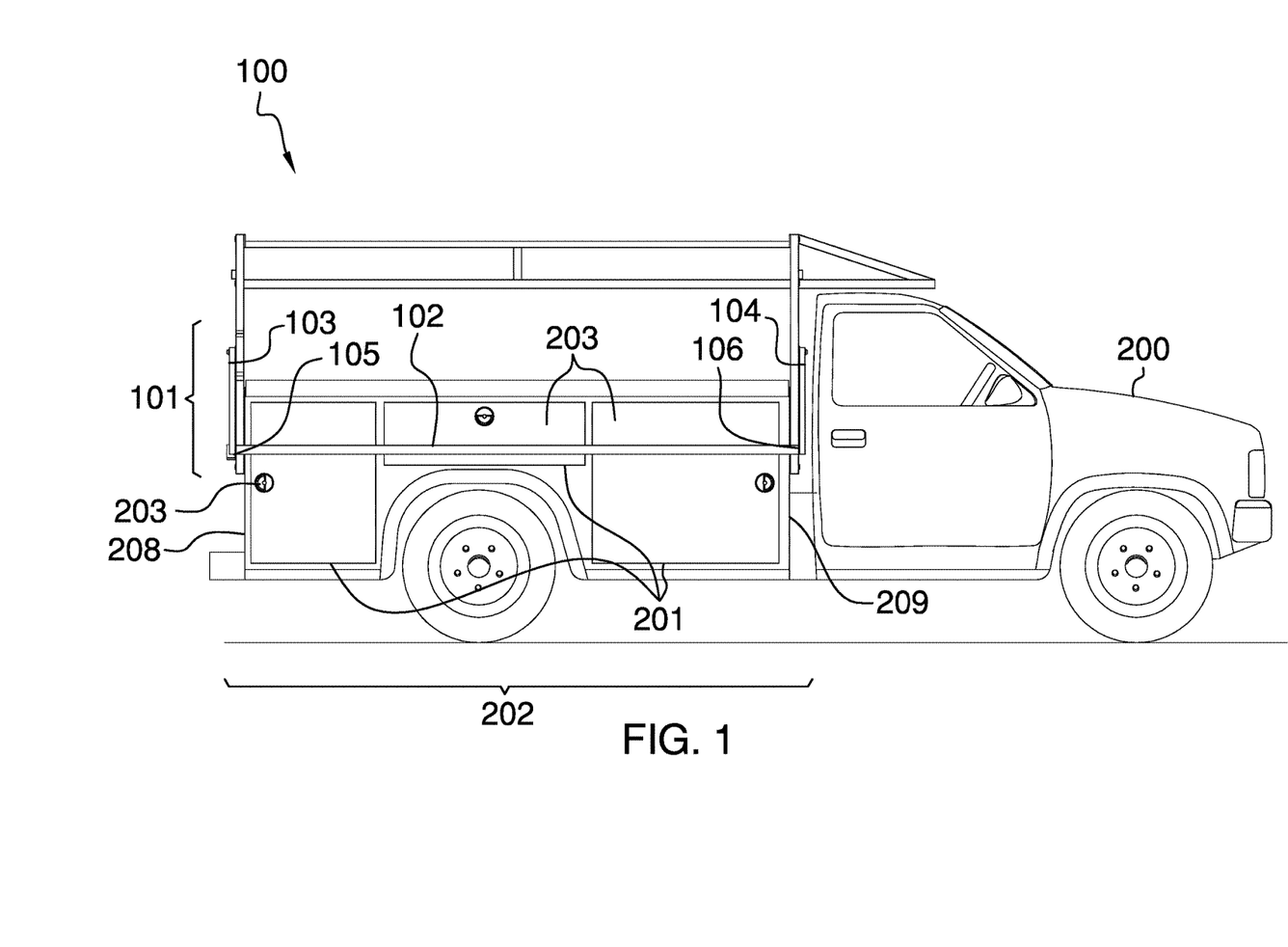
FIG. 1 is a side view of an embodiment of the disclosure.
Figure 2:
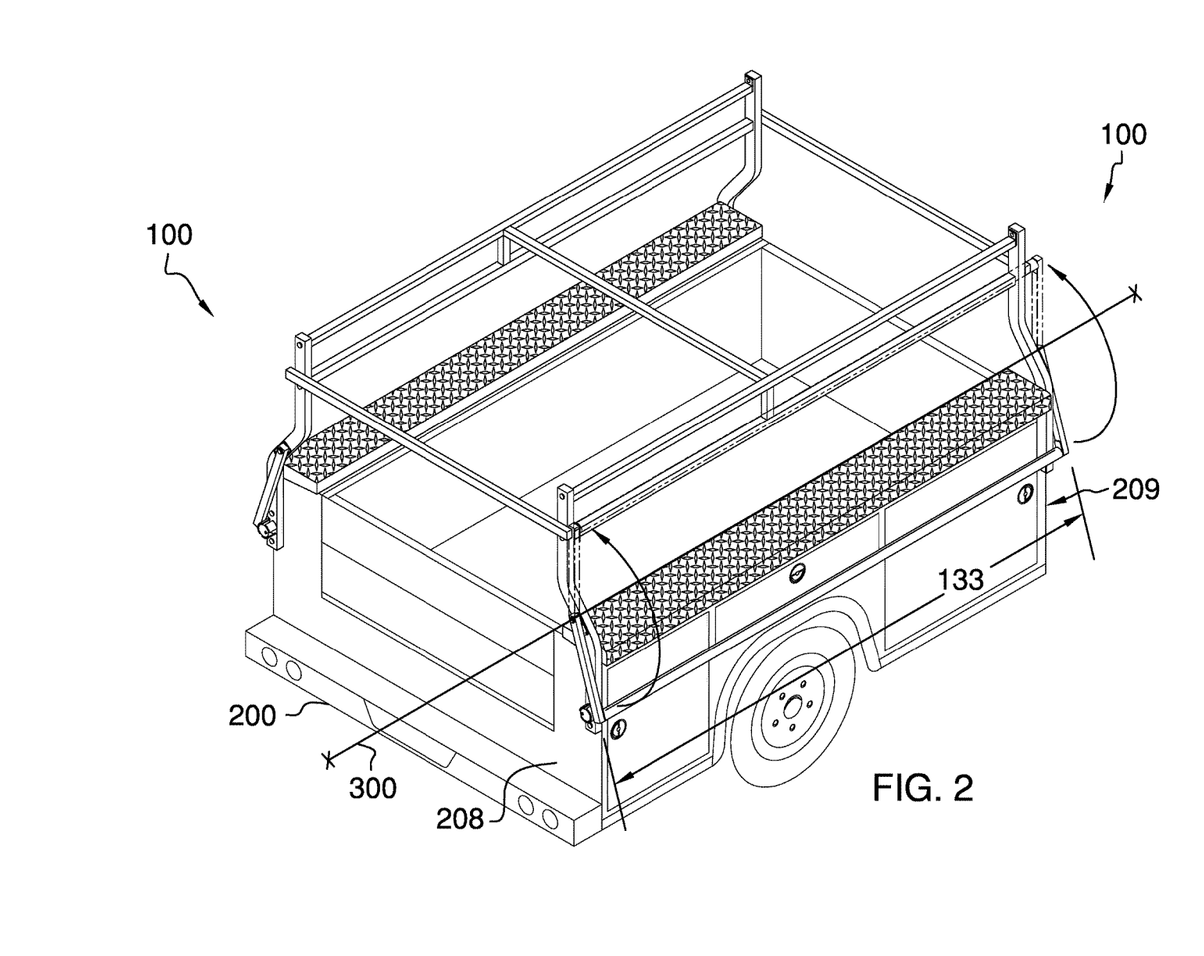
FIG. 2 is a perspective view of an embodiment of the disclosure in use.

It shall also be noted that the invention 100 is adapted to be installed on either or both sides of the vehicle 200. FIGS. 2 and 4 depict use of the invention 100 on both sides of the truck bed portion 202 of the vehicle 200. However, it may be up to the end user as to whether the invention 100 is installed on one side or both sides of the vehicle 200.

With respect to the above description, it is to be realized that the optimum dimensional relationship for the various components of the invention described above and in FIGS. 1 through 7, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invetnion is to be limited only by the scope of the following claims and their equivalents.

What is claimed is:

1. A pivoting bar lock comprising:
a locking bar, a first locking arm, and a second locking arm that collectively are adapted to pivot with respect to a vehicle in order to adaptively restrict access to at least one truck bed cabinet;
wherein the pivoting bar lock is adapted to restrict access to the at least one truck bed cabinet;
wherein the at least one truck bed cabinet is a plurality of truck bed cabinets;
wherein the locking bar is further defined with a first distal end as well as a second distal end;
wherein the first locking arm is affixed to the locking bar at the first distal end;
wherein the second locking arm is affixed to the locking bar at the second distal end;
wherein the vehicle has the plurality of truck bed cabinets provided on an exterior side surface of a truck bed portion of the vehicle;
wherein the locking bar works to either impede access to the plurality of truck bed cabinets by locking in place in adaptive adjacency of the truck bed cabinets;
wherein the locking bar prevents a cabinet door of any of the truck bed cabinets from opening;
wherein the first locking arm and the second locking arm are each able to pivot with respect to the vehicle via a pivot pin;
wherein the pivot pin interacts with a pivot bracket;
wherein the pivot bracket is rigidly affixed to a frame;
wherein the frame is either adapted to be a component of the vehicle or is adapted to be affixed to the vehicle;
wherein the frame extends upwardly and over the truck bed portion;
wherein the frame is rigidly affixed to a rear bed surface and a front bed surface of the truck bed portion of the vehicle;
wherein a first locking bracket is affixed to the frame;
wherein the first locking arm includes a second locking bracket;
wherein the first locking bracket and the second locking bracket are able to align with one another provided the locking bar is rotated down to the locking position;
wherein the first locking bracket and the second locking bracket collectively form a perimeter wall that is able to partially surround a lock that is installed therein;
wherein the first locking bracket and the second locking bracket each have a lock tab that touch one another when the first locking bracket is aligned with the second locking bracket.

2. The pivoting bar lock according to claim 1 wherein the lock tabs of the first locking bracket and the second locking bracket are aligned with one another and tab holes provided therein.

3. The pivoting bar lock according to claim 2 wherein the lock secures the lock tabs together via the tab holes.

4. The pivoting bar lock according to claim 3 wherein the locking bar, the first locking arm, and the second locking arm collectively rotate about a lateral axis; wherein the lateral axis is parallel with the direction of travel of the vehicle; wherein the lateral axis is defined via the pivot pins and the pivot brackets.

5. The pivoting bar lock according to claim 4 wherein the locking bar is made of a tubular construction and utilize at least two pieces that are telescopically arranged with one another such that a locking bar length is adjusted.

6. The pivoting bar lock according to claim 5 wherein the locking bar is further defined as a first bar member and a second bar member.

7. The pivoting bar lock according to claim 6 wherein the first bar member has a first outer diameter that is less than a second inner diameter of the second bar member; wherein the first bar member is able to slide into the second bar member; wherein at least one bar hole is provided on the second bar member to enable a spring-loaded button provided on the first bar member; wherein the spring-loaded button enables adjustment of the locking bar length.

* * * * *